United States Patent
Yang et al.

(10) Patent No.: US 10,803,494 B2
(45) Date of Patent: Oct. 13, 2020

(54) CREATING A SEQUENCE OF IMAGES FOR PRESENTATION IN A CONTENT ITEM PRESENTED BY AN ONLINE SYSTEM FROM CONTENT ASSOCIATED WITH THE CONTENT ITEM

(71) Applicant: Facebook, Inc., Menlo Park, CA (US)

(72) Inventors: Hongji Yang, Fremont, CA (US); Rachel Barrie Tucker, San Francisco, CA (US); Zhen Li, Cupertino, CA (US); Nikila Srinivasan Sarang, San Francisco, CA (US); Sylvain Marc Robert Friquet, London (GB); Brendan M. Sullivan, Harvard, MA (US); Kelly Leanne MacLean, Palo Alto, CA (US)

(73) Assignee: FACEBOOK, INC., Menlo Park, CA (US)

(*) Notice: Subject to any disclaimer, the term of this patent is extended or adjusted under 35 U.S.C. 154(b) by 756 days.

(21) Appl. No.: 15/047,596

(22) Filed: Feb. 18, 2016

(65) Prior Publication Data
US 2017/0243258 A1   Aug. 24, 2017

(51) Int. Cl.
*G06Q 30/00* (2012.01)
*G06Q 30/02* (2012.01)

(52) U.S. Cl.
CPC .................. *G06Q 30/0276* (2013.01)

(58) Field of Classification Search
None
See application file for complete search history.

(56) References Cited

U.S. PATENT DOCUMENTS

| | | | | |
|---|---|---|---|---|
| 8,548,848 B1* | 10/2013 | Shaw | ..................... | G06Q 30/00 705/14.1 |
| 9,829,947 B1* | 11/2017 | Nagarajan | ............. | G06F 1/3234 |
| 2005/0097599 A1* | 5/2005 | Plotnick | ............... | G11B 27/005 725/32 |
| 2013/0343727 A1* | 12/2013 | Rav-Acha | ............ | G11B 27/031 386/282 |
| 2014/0157306 A1* | 6/2014 | Deo | ................... | H04N 21/4788 725/34 |
| 2015/0161673 A1* | 6/2015 | Guo | ................... | G06Q 30/0269 705/14.66 |
| 2015/0286643 A1* | 10/2015 | Kumar | .............. | G06F 17/30672 707/728 |
| 2016/0042490 A1* | 2/2016 | Bost | ......................... | G06T 1/60 345/547 |

* cited by examiner

*Primary Examiner* — Meredith A Long

(57) ABSTRACT

An online system receives an advertisement request ("ad request") including an advertisement from a user and allows the user to create an alternative advertisement for the ad request comprising images presented in an order specified by the user. The online system may identify images from video data included in the ad request or from additional content associated with an object associated with the ad request. Based on selections of identified images by the user and an order in which to present the selected images from the user, the online system generates the alternative advertisement and associates the alternative advertisement with the ad request. One or more criteria are associated with the alternative advertisement, and the online system communicates the alternative advertisement to client devices having characteristics satisfying the criteria rather than video data in the advertisement.

20 Claims, 3 Drawing Sheets

300

CREATING A SEQUENCE OF IMAGES FOR PRESENTATION IN A CONTENT ITEM PRESENTED BY AN ONLINE SYSTEM FROM CONTENT ASSOCIATED WITH THE CONTENT ITEM

BACKGROUND

This disclosure relates generally to online systems, and more specifically to generating content for presentation to online system users.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting online system users with certain types of sponsored content provided by the user. Frequently, online systems charge a user for each presentation of sponsored content to an online system user or for each interaction with sponsored content by an online system user. For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item.

Increasingly, sponsored content includes video data for presentation to online system users to inform the online system users of a user's products or services or to persuade the online system users to perform actions. However, users accessing content from the online system using client devices having limited functionality or from regions with limited or poor network connectivity may have difficulty viewing video data included in a sponsored content item. For example, client devices having limited functionality fail to present sponsored content items (or other content item) including video data. As another example, video data in a sponsored content is erratically presented by client devices with poor or limited connectivity to a network. These errors in presenting video data may reduce user interaction with sponsored content items including video data, which reduces interaction by users with content provided by the online system and may reduce revenue received by the online system from presenting sponsored content.

SUMMARY

An online system receives an advertisement request ("ad request") from a user that includes advertisement content for presentation to users (also referred to as an "advertisement") that includes video data and a bid amount specifying an amount of compensation an advertiser associated with the ad request provides the online system for presenting the advertisement in the ad request, for a user interacting with the advertisement in the ad request, or for another suitable interaction with the advertisement in the ad request. The online system identifies images associated with the advertisement and presents the identified images to the user through an interface. By interacting with the interface, the user generates a sequence of selected images and an order in which the selected images are to be presented. The online system stores the sequence of selected images and the order in which the selected images are to be presented in associated with the ad request.

In various embodiments, the images identified to the user by the online system are obtained from the video data included in the advertisement. For example, the online system identifies various frames in the video data in the advertisement and identifies different frames of the video data in the advertisement as the images. In some embodiments, the online system identifies each frame of the video data as an image. Alternatively, the online system identifies a subset of frames of the video data as the images.

Additionally or alternatively, the online system may identify images from additional content associated with an object (e.g., a product, a service) associated with the ad request. In various embodiments, the online system identifies images from content items associated with the object based on affinities of users of the online system for various content items associated with the object. For example, the online system ranks content items associated with the object that include images based on affinities of users of the online system for the content items and identifies images included in content items having at least a threshold position in the ranking. In some embodiments, the online system also accounts for user engagement with content items including images and associated with the object associated with the ad request when ranking or when selecting the content items. For example, the online system accounts for positive (e.g., expressing a preference for a content item, sharing a content item) and negative (e.g., hiding a content item) interactions with content items associated with the object and modifies affinities for the content items based on positive or negative interactions with the content items by online system users. The online system may identify images from a landing page associated with the advertisement in the ad request or from content included in domain including the landing page associated with the advertisement in some embodiments. Hence, the online system may identify images from the video data included in the advertisement, from content items associated with the object associated with the advertisement, from a domain associated with the advertisement, or from any other suitable source.

In some embodiments, the user specifies one or more parameters when selecting images from the identified images. For example, one or more parameters specify a duration that a selected image is presented; different durations may be associated with different selected images. As another example, one or more parameters identify transitions between selected images having adjacent positions in the order in which the selected images are to be presented; the one or more parameters may specify audio data or visual effects (e.g., fading) presented when transitioning from presentation of a selected image to the selected image having a subsequent position in the order. Additionally, one or more parameters may identify audio data presented while selected images are presented; different audio data may be associated with different selected images or audio data may be associated with multiple selected images. One or more parameters may specify text data presented along with one or more selected images as well as positioning of the text data relative to a selected image (e.g., above the selected image, overlaid on the selected image, below the selected image, etc.). Other parameters may specify templates for presentation of selected images, themes for presentation of selected images, or other suitable attributes for presenting selected images in an order.

The online system generates an alternative advertisement including the selected images, the order in which the selected images are to be presented, and one or more parameters, if any, and associates the alternative advertisement with the ad request. When the online system receives a request to present one or more advertisements to a viewing user from a client device, the online system includes the ad request in one or more selection processes if the ad request does not include targeting criteria or includes at least a threshold number of targeting criteria satisfied by characteristics of the viewing user. In one embodiment, the request identifies a type of client device on which the one or more advertisements are to be presented, and the online system determines whether to include the advertisement or the alternative advertisement in the ad request based on the type of client device. For example, the user associates the alternative advertisement with one or more types of client devices when selecting the images for the alternative advertisement. If the request for one or more advertisements identifies a client device having a type matching a type of client device associated with the alternative advertisement, the online system includes the alternative advertisement in the ad request when the ad request is included in one or more selection processes. Alternatively, the online system selects the advertisement or the alternative advertisement based on the type of client device on which one or more advertisements are to be presented if the ad request is selected by the one or more selection processes. In other embodiments, the online system may select the advertisement or the alternative advertisement based on a strength of a connection to a network by the client device on which the one or more advertisements are to be presented. For example, if the client device on which the one or more advertisements are to be presented has less than a threshold connection strength to a network, the online system selects the alternative advertisement; however, if the client device on which the one or more advertisements are to be presented has at least the threshold connection strength to the network, the online system selects the advertisement.

If the online system selects the ad request and selects the alternative advertisement, the alternative advertisement is communicated to the client device from which the request for one or more advertisements was received. When the alternative advertisement is presented by the client device, the client device communicates information identifying an image from the alternative advertisement that was presented if the viewing user interacts with the alternative advertisement. For example, the client device communicates a description of the viewing user's interaction with the alternative advertisement and an identifier of an image from the alternative advertisement that was presented when the viewing user performed the interaction. The online system may associate interactions with different images from the alternative advertisement, allowing the user providing the ad request including the alternative advertisement to evaluate effectiveness of different images in the alternative advertisement in obtaining user interaction.

Hence, the online system allows a user providing an ad request including an advertisement to generate an alternative advertisement comprising images presented in an order specified by the user. The online system selects the alternative advertisement for presentation to a viewing user when certain conditions are satisfied. For example, the online system selects the alternative advertisement for presentation when one or more advertisements are to be presented on certain types of client devices, when a client device has less than a threshold connection strength to a network, or when a client device has a particular type of connection to a network. This allows the online system to present the alternative advertisement when the advertisement included in the ad request may be improperly or poorly presented to provide content to users with which the users are more likely to interact.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
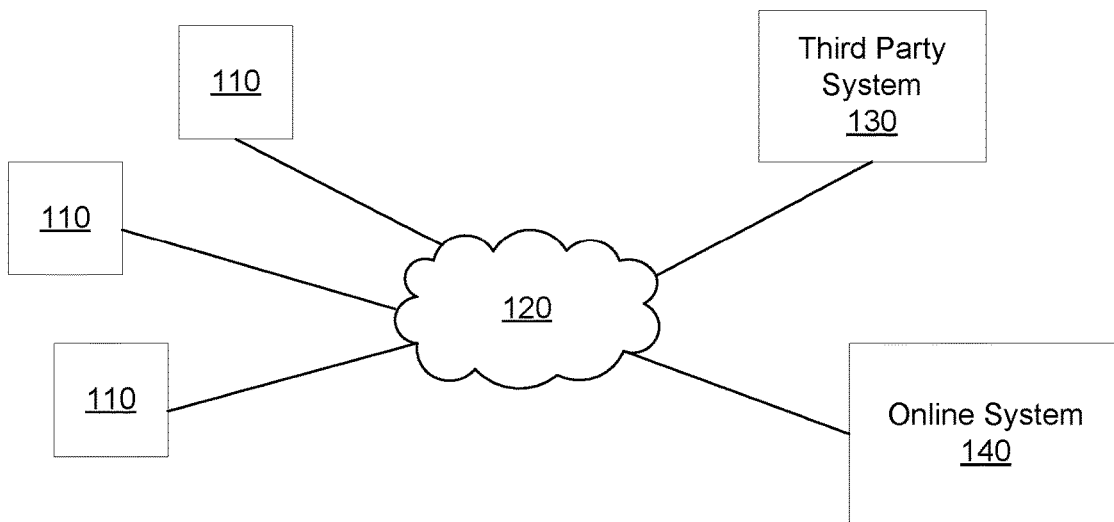
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 to the online system 140 in exchange presenting the advertisements to the online system 140. Content presented by the online system 140 for which the online system 140 receives compensation in exchange for presenting is referred to herein as "sponsored content." Sponsored content from a third party system 130 may be associated with the third party system 130 or with another entity on whose behalf the third party system 130 operates.

Figure 2:
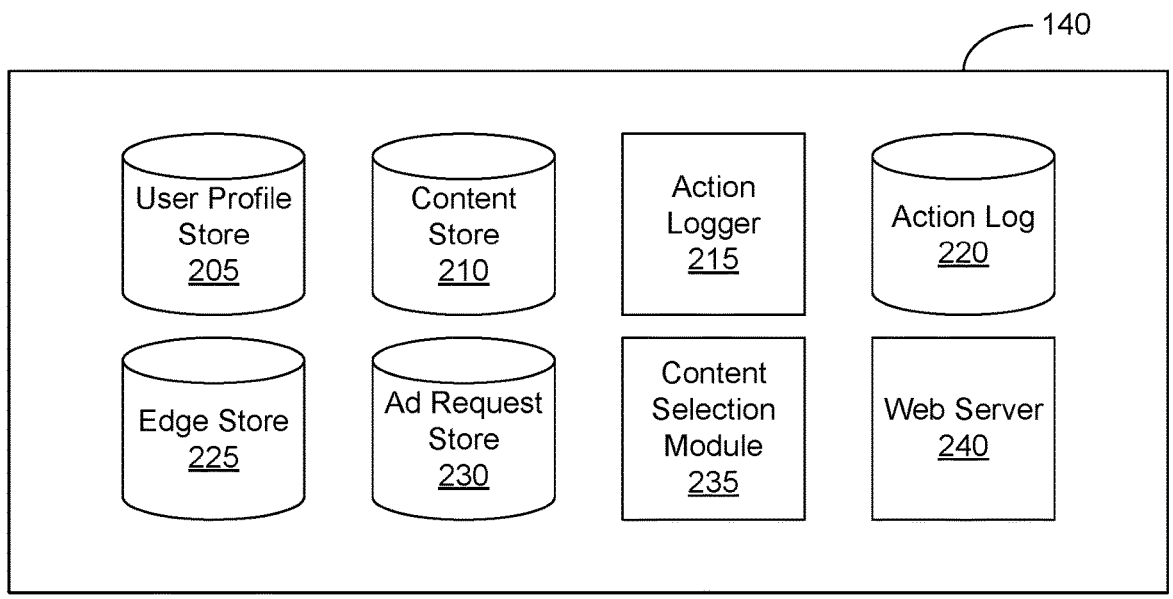
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 140 if an advertisement in the ad request is presented to a user, if the advertisement in the ad request receives a user interaction when presented, or if any suitable condition is satisfied when the advertisement in the ad request is presented to a user. For example, the bid amount specifies a monetary amount that the online system 140 receives from the advertiser if an advertisement in an ad request is displayed. In some embodiments, the expected value to the online system 140 of presenting the advertisement may be determined by multiplying the bid amount by a probability of the advertisement being accessed by a user.

If the advertisement in an ad request includes video data, the advertisement may be incorrectly or erroneously presented by certain client devices 110 or when a connection between a client device 110 and a network 120 has certain characteristics. For example, a client device 110 with limited functionality may be unable to present video data in the advertisement. As another example, when a connection between a client device 110 and a network 120 has less than a threshold signal strength, video data presented by the client device 110 may be choppy or slow to be presented. Hence, an advertisement including video data may be less likely to be interacted with by a user when presented by client device 110 having certain characteristics. To increase likelihoods of users interacting with content from an ad request including an advertisement having video data, the online system 140 allows a user associated with the ad request to generate an alternative advertisement for presentation when a client device 110 has characteristics satisfying one or more criteria. The alternative advertisement comprises images selected by the user associated with the ad request that are presented in a specified order and is associated with the ad request. Generation of an alternative advertisement is further described below in conjunction with FIG. 4.

Figure 3:
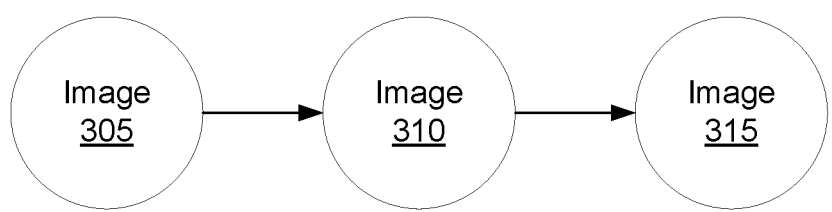
FIG. 3 is an example advertisement comprising images and an order in which the images are to be presented, in accordance with an embodiment.

FIG. 3 shows an example of an alternative advertisement 300 associated with an ad request. In the example of FIG. 3, the alternative advertisement 300 includes image 305, image 310, and image 315. When the alternative advertisement 300 is presented by a client device 110, image 305 is presented for a duration, image 310 is presented for a duration, then image 315 is presented for a duration. In some embodiments, image 305, image 310, and image 315 are presented for different durations; alternatively, image 305, image 310, and image 315 are each presented for the same duration. As further described below in conjunction with FIG. 4, a user associated with the ad request (e.g., a user who provided the ad request to the online system 140) selects image 305, image 310, and image 315 from images obtained from video data in an advertisement included in the ad request or from other content associated with an object associated with the ad request. Additionally, the user may specify one or more parameters for presentation of different images 305, 310, 315 in the alternative advertisement 300. For example, a parameter specifies a visual effect presented when the alternative advertisement 300 transitions from presenting image 305 to presenting image 310. As another example, a parameter specifies text data presented in conjunction with image 315 as well as a location of the text data relative to image 315 in the alternative advertisement 300.

Additionally, an ad request may include one or more targeting criteria specified by the advertiser. Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 140 for presenting an advertisement from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

In various embodiments, the content selection module 235 provides an interface to a user to generate an alternative advertisement for association with an ad request provided to the online system 140 by the user or with an ad request otherwise associated with the user. For example, if an ad request has an advertisement including video data, the content selection module 235 provides an interface to a user associated with the ad request that allows the user to generate an alternative advertisement comprising images presented in an order specified by the user. As further described below in conjunction with FIG. 4, the online system 140 communicates the alternative advertisement to client devices 110 having characteristics satisfying one or more criteria specified by the user rather than the advertisement included in the ad request. The content selection module 235 identifies images associated with the ad request or with an object associated with the ad request and presents the identified images to the user via the interface. As further described below in conjunction with FIG. 4, the content selection module 235 identifies images as frames from the video data included in the advertisement or identifies images from other content associated with the object associated with the ad request and accessible to the online system (e.g., from content items presented by a page maintained by the online system 140 and associated with the object associated with the ad request, from content items associated with the object provided to the online system 140, from a domain specified by a landing page included in the advertisement, etc.).

If the content selection module 235 includes an ad request having an advertisement and an alternative advertisement in one or more selection processes for presentation to a user, the content selection module 235 obtains characteristics of a client device 110 on which the advertisement or the alternative advertisement is to be presented. Based on a comparison of the obtained characteristics to one or more criteria associated with the alternative advertisement, the content selection module 235 selects the advertisement or the alternative advertisement for presentation. In response to determining characteristics of the client device 110 satisfy one or more of the criteria, the content selection module 235 selects the alternative advertisement for presentation; however, in response to determining characteristics of the client device 110 do not satisfy at least one of the criteria, the content selection module 235 selects the advertisement for presentation. For example, if a type of the client device 110 matches a type specified by criteria associated with the alternative advertisement, the content selection module 235 selects the alternative advertisement for presentation if the ad request is selected by the one or more selection processes.

Additionally, the content selection module 235 communicates information to the action log 220 identifying an image from the alternative advertisement that was presented when a user interacted with the alternative advertisement presented via a client device 110. For example, when the content selection module 235 receives information from the client device 110 describing an interaction with the alternative advertisement presented by the client device 110 and information identifying an image from the alternative advertisement presented when the user performed the interaction, the content selection module 235 communicates information identifying the user, identifying the interaction by the user, and identifying an image from the alternative advertisement to the action log 220 for storage in association with the ad request. A user associated with the ad request may retrieve information from the action log 220 describing interactions by users with the alternative advertisement when different images from the alternative advertisement were presented to evaluate effectiveness of various images in the alternative advertisement in inciting interactions by users.

For example, the content selection module 235 receives a request to present a feed of content (also referred to as a "content feed") to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user and selects content items based on the retrieved information. For example, information describing actions associated with other users connected to the user or other data associated with users connected to the user is retrieved and used to select content items describing actions associated with one or more of the other users. Additionally, one or more ad requests may be retrieved from the ad request store 230. The retrieved ad requests and other content items are analyzed by the content selection module 235 to identify candidate content items that are likely to be relevant to the user. For example, content items associated with users who not connected to the user or content items associated with users for whom the user has less than a threshold affinity are discarded as candidate content items. Based on various criteria, the content selection module 235 selects one or more of the candidate content items or ad requests identified as candidate content items for presentation to the user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

The web server 240 links the online system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Figure 4:
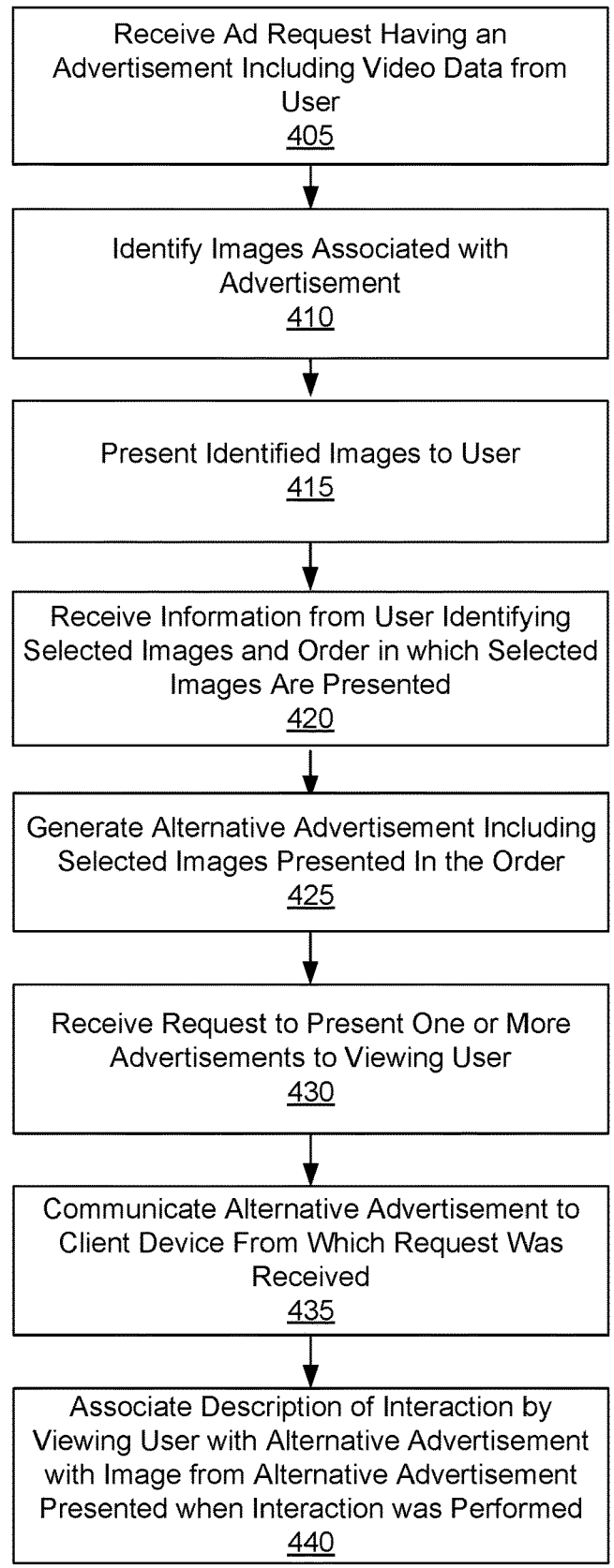
FIG. 4 is a flowchart of a method for creating an alternative advertisement comprising images presented in an order for an advertisement request ("ad request"), in accordance with an embodiment.

Generating an Alternative Advertisement Comprising Image Data for an Advertisement Including Video Data FIG. 4 is a flowchart of one embodiment of a method for creating an alternative advertisement comprising images presented in an order for inclusion in an advertisement request ("ad request"). In other embodiments, the method may include different and/or additional steps than those shown in FIG. 4. Additionally, in some embodiments, the steps described in conjunction with FIG. 4 may be performed in different orders than the order described in conjunction with FIG. 4.

The online system 140 receives 405 an advertisement request ("ad request") from a user that includes an advertisement comprising video data for presentation to one or more users and a bid amount specifying an amount of compensation the online system 140 receives in exchange for presenting the advertisement in the ad request to a user or in exchange for the user performing one or more interactions with the advertisement in the ad request. As further described above in conjunction with FIG. 2, the ad request may include targeting criteria specifying characteristics of users eligible to be presented with the advertisement included in the ad request. As the video data in the advertisement may be poorly or inaccurately presented on various types of client devices 110 or when a client device 110 obtains content from the online system through certain types of connections to a network 120, the online system 140 allows a user to generate an alternative advertisement associated with the ad request. The alternative advertisement does not include video data, but instead includes multiple images that are presented in a specified order.

To generate the alternative advertisement, the online system 140 identifies 410 images associated with the advertisement and presents 415 the identified images to the user through an interface. In various embodiments, the online system 140 identifies 410 the images from the video data included in the advertisement. For example, the online system 140 extracts frames from the video data in the advertisement and identifies 410 images as different frames from the video data. In some embodiments, the online system 140 identifies 410 each frame of the video data in the advertisement as an image. Alternatively, the online system 140 identifies 410 a subset of frames of the video data as the images.

Additionally or alternatively, the online system 140 may identify 410 images from additional content associated with an object (e.g., a product, a service) associated with the ad request and accessible to the online system 140. For example, the online system 140 identifies 410 images from content items provided to a page associated with the object or associated with the user that is maintained by the online system 140. In various embodiments, the online system 140 identifies 410 images from content items associated with the object based on affinities of users of the online system 140 for the content items. For example, the online system 140 ranks content items associated with the object that include images based on affinities of users of the online system 140 for the content items and identifies 410 images included in content items having at least a threshold position in the ranking. As another example, the online system 140 identifies 410 images included in content items having at least a threshold affinity. The online system 140 may use affinities of online system users having certain characteristics to identify 410 images from content items associated with the object. For example, the online system 140 ranks content items associated with the object based on affinities of users having characteristics satisfying targeting criteria in the ad request and identifies 410 images from content items having at least a threshold position in the ranking.

In some embodiments, the online system 140 also accounts for user engagement with content items including images and associated with the object associated with the ad request to determine content items from which images are identified 410. For example, the online system 140 generates engagement scores for content items associated with the object associated with the ad request, with an engagement score for a content item based on positive interactions (e.g., expressing a preference for a content item, sharing a content item) with the content item and negative interactions (e.g., hiding a content item) with the content item. The online system 140 may rank the content items based on their engagement scores and identify 410 images from content items having at least a threshold position in the ranking. In some embodiments, the online system 140 ranks content items associated with the object based on combinations of engagement scores for the content items and affinities for the content items and identifies 410 images from content items having at least a threshold position in the ranking. Alternatively, the online system 140 identifies 410 images from content items having at least a threshold engagement score. Additionally, the online system 140 may identify 410 images from a landing page specified by the advertisement in the ad request or from content included in a domain including the landing page associated with the advertisement (e.g., images included in pages maintained in the domain including the landing page associated with the advertisement) in some embodiments. Hence, the online system 140 may identify 410 images from one or more sources (e.g., video data included in the advertisement, content items maintained by the online system 140 and associated with the object associated with the advertisement, a domain associated with the advertisement) in various embodiments. The user from whom the ad request was received 405 may specify sources for the images when providing the ad request to the online system 140, or the online system 140 maintains information associated with the user identifying sources of images for an alternative advertisement.

By interacting with the interface presenting 415 the identified images, the user selects images and an order in in which the selected images are to be presented. The online system 140 receives 420 information identifying the selected images and the order in which the selected images are to be presented in associated with the ad request. In some embodiments, the user also specifies one or more parameters for presenting images when selecting images from the identified images. For example, one or more parameters specify a duration that a selected image is presented. Different durations may be associated with different selected images. As another example, one or more parameters identify transitions between selected images having adjacent positions in the order in which the selected images are to be presented. Parameters may specify audio data or visual effects (e.g., fading) presented during a transition from presentation of a selected image to presentation of selected image having a subsequent position in the order. Additionally, one or more parameters may identify audio data presented during presentation of selected images. Different audio data may be associated with different selected images, allowing different audio data to be presented while different selected images are presented; alternatively, audio data is associated with multiple selected images, so the audio data is presented during presentation of various selected images. One or more parameters may specify text data presented along with one or more selected images as well as positioning of the text data relative to a selected image (e.g., above the selected image, overlaid on the selected image, below the selected image, etc.). Other parameters may specify templates for presentation of selected images, themes for presentation of selected images, or other suitable attributes for presenting the selected images.

Additionally, by interacting with the interface presenting 415 the identified images, the user specifies one or more criteria that, when satisfied, cause presentation of the selected images in the order. For example, the criteria identify one or more types or models of client devices 110 on which the selected images are presented. As another example, the criteria identify a type of connection between a client device 110 and a network 120 that, when used to communicate between the client device 110 and the network 120 cause presentation of the selected images by the client device 110. In another example, the criteria identify a threshold connection strength to a network 120, so when a client device 110 has less than the threshold connection strength to the network, the selected images are presented by the client device 110. However, any other suitable criteria for presenting the selected images may be specified in various embodiments.

Based on the selected images, the order in which the selected images are presented, and one or more parameters (if any) received 420 from the user, the online system 140 generates 425 an alternative advertisement including the selected images presented in the order using the one or more parameters (if any). The online system 140 associates the alternative advertisement with the ad request and with the criteria for presenting the selected images in the order comprising the alternative advertisement. In another embodiment, the online system 140 generates an alternative ad request including the alternative advertisement, the bid amount from the ad request, and targeting criteria from the ad request. The online system 140 associates the alternative ad request with the ad request and with the criteria for presenting the selected images comprising the alternative advertisement.

When the online system 140 receives 430 a request to present one or more advertisements to a viewing user from a client device 110, if the ad request does not include targeting criteria or includes at least a threshold number of targeting criteria satisfied by characteristics of the viewing user, the online system 140 includes the ad request in one or more selection processes. For example, when the online system 140 receives 430 a request from a client device 110 for content for presentation to the viewing user, the online system 140 includes the ad request in one or more selection processes if the ad request does not include targeting criteria or includes at least a threshold number of targeting criteria satisfied by characteristics of the viewing user. In one embodiment, the request identifies a type of client device 110 on which the one or more advertisements are to be presented. For example, the request includes a device identifier of the client device 110 or a type of the client device 110. The request may include additional information, such as a type of connection between the client device 110 and the network 120 or a connection strength between the client device 110 and the network 120.

The online system 140 determines whether to include the advertisement or the alternative advertisement in the ad request based information in the request, in some embodiments. For example, the online system 140 determines whether a type of client device 110 included in the request matches one or more types of client devices 110 specified by the criteria that cause presentation of the selected images comprising the alternative advertisement. If the type of client device 110 included in the request matches a type of client device 110 specified by the criteria, the online system 140 includes the alternative advertisement in the one or more selection processes. However, if the type of client device 110 included in the request does not match at least one type of client device 110 specified by the criteria, the online system 140 includes the advertisement in the one or more selection processes. Similarly, if the request specifies a type of connection between the client device 110 and the network 120 matching a type of connection specified by the criteria, the online system 140 includes the alternative advertisement in the one or more selection processes. In other embodiments, the request includes a connection strength between the client device 110 and the network 120, and the online system 140 includes the alternative advertisement in the one or more selection processes if the connection strength is less than a connection strength specified by the criteria. Alternatively, the online system 140 communicates with the client device 110 after receiving 430 the request from the client device 110 to obtain characteristics of the client device 110 for comparison to the criteria associated with the alternative advertisement to determine whether to include the alternative advertisement in the one or more selection processes.

If the one or more selection processes selects the ad request including the alternative advertisement, the online system 140 communicates 435 the alternative advertisement to the client device 110 from which the request for one or more advertisements was received 430. During presentation by the client device 110, the alternative advertisement presents the selected images in the order included in the alternative advertisement (and using parameters specified by the user, if any). When the alternative advertisement is presented by the client device 110, if the viewing user interacts with the alternative advertisement, the client device 110 transmits information describing the interaction by the viewing user and identifying an image from the alternative advertisement that was presented when the viewing user performed the interaction. The online system 140 associates 440 the description of the interaction by the viewing user with information identifying the image from the alternative advertisement presented when the viewing user performed the interaction. For example, the client device 110 communicates a description of the viewing user's interaction with the alternative advertisement and an identifier of an image from the alternative advertisement that was presented when the viewing user performed the interaction to the online system 140, which associates a description of the interaction with the identifier of the image from the alternative advertisement. The user from whom the ad request was received 405 may access descriptions of interactions by various users with different selected images in the alternative advertisement to evaluate effectiveness of different selected images in inciting interactions by users presented with the alternative advertisement.

While FIGS. 2-4 describe generation of an alternative advertisement for presentation in place of an advertisement including video data, in other embodiments, the online system 140 allows generation of alternative content items for other types of content items including video data. For example, if the online system 140 receives a content item from a user including video data, the online system 140 identifies images associated with the content item from the video data itself or from other content items associated with an object associated with the content item and presents an interface including the identified images to the user, as further described above in conjunction with FIG. 4. Based on interaction by the user with the interface, the online system 140 receives selections of images and an order in which to present the selected images, as well as one or more parameters for presenting the images in the order; based on the selected images, the order, and the one or more parameters, the online system 140 generates an alternative content item associated with the content item, as further described above in conjunction with FIG. 4. The online system 140 also receives criteria that, when satisfied, cause presentation of the alternative content item in place of the content item. As further described above in conjunction with FIG. 4, when the online system 140 receives a request to present content to a viewing user, the online system 140 determines whether to present the content item or the alternative content item to a viewing user, and communicates the alternative content item to a client device 110 associated with the viewing user if characteristics of the client device 110 associated with the viewing user satisfy one or more of the criteria for presenting the alternative content item. Information describing an image from the alternative content item presented when the viewing user interacted with the alternative content item may also be communicated to the online system 140 by the client device 110 associated with the viewing user and stored by the online system 140, as further described above in conjunction with FIG. 4.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving an advertisement request ("ad request") at an online system from a user, the ad request associated with an object and including an advertisement comprising video data, and the ad request specifying one or more sources of images;
identifying, by the online system, a plurality of images associated with the advertisement in the ad request, the identifying based on:
extracting one or more frames from the video data and identifying each extracted frame as a different image, and
identifying one or more images from the specified one or more sources of images;
presenting the identified plurality of images to the user;
receiving information from the user in association with the identified plurality of images, the information identifying a plurality of selected images of the identified plurality of images, specifying an order in which the plurality of selected images are to be presented, and specifying individual durations of presentation associated with each of the plurality of selected images;
receiving criteria for presenting an alternative advertisement, the criteria comprising one or more client device characteristics;
generating, by the online system, an alternative advertisement comprising the plurality of selected images presented in the order for the associated specified individual durations, the generated alternative advertisement not including video data; and
associating the alternative advertisement generated by the online system with the ad request and with the one or more criteria for presenting the selected images in the order.

2. The method of claim 1, further comprising:
receiving a request for one or more advertisements from a client device associated with a viewing user;
obtaining information associated with the client device associated with the viewing user;

determining information associated with the client device associated with the viewing user satisfies one or more criteria for presenting the selected images in the order; and responsive to the determining, including the alternative advertisement rather than the advertisement in one or more selection processes selecting content for presentation to the viewing user in response to the received request for one or advertisements from the client device.

3. The method of claim 2, wherein obtaining information associated with the client device associated with the viewing user comprises obtaining information from the received request.

4. The method of claim 2, wherein the one or more criteria for presenting the selected images in the order specify one or more types of client devices, and determining information associated with the client device associated with the viewing user satisfies one or more criteria for presenting the selected images in the order comprises:
determining a type of the client device associated with the viewing user matches a type of client device specified by the one or more criteria.

5. The method of claim 2, wherein the one or more criteria for presenting the selected images in the order specify a threshold connection strength to a network, and determining information associated with the client device associated with the viewing user satisfies one or more criteria for presenting the selected images in the order comprises:
determining a connection strength of the client device associated with the viewing user to the network is less than the threshold connection strength.

6. The method of claim 2, wherein the one or more criteria for presenting the selected images in the order specify one or more types of connections to a network, and determining information associated with the client device associated with the viewing user satisfies one or more criteria for presenting the selected images in the order comprises:
determining a type connection between the client device associated with the viewing user and the network matches a type of connection to the network specified by the one or more criteria.

7. The method of claim 2, further comprising:
communicating the alternative advertisement to the client device associated with the viewing user.

8. The method of claim 7, further comprising:
receiving information from the client device associated with the viewing user including a description of an interaction by the viewing user with the alternative advertisement and a selected image from the alternative advertisement presented within the viewing user performed the interaction; and
associating the describing the interaction by the viewing user with the alternative advertisement with information identifying the selected image from the alternative advertisement presented within the viewing user performed the interaction.

9. The method of claim 1, wherein identifying, by the online system, the plurality of images associated with the advertisement in the ad request comprises:
identifying content items maintained by the online system and associated with the object associated with the ad request; and
identifying images from one or more of the identified content items.

10. The method of claim 9, wherein identifying images from one or more of the identified content items comprises:
determining affinities of users of the online system for the identified content items;
ranking the identified content items based on the determined affinities; and
identifying images from identified content items having at least a threshold position in the ranking.

11. The method of claim 9, wherein identifying images from one or more of the identified content items comprises:
determining engagement scores for the identified content items based on interactions by online system users with the identified content items;
ranking the identified content items based on the determined engagement scores; and
identifying images from identified content items having at least a threshold position in the ranking.

12. The method of claim 1, wherein identifying, by the online system, the plurality of images associated with the advertisement in the ad request comprises:
identifying a landing page included in the advertisement; and
identifying images from the landing page included in the advertisement.

13. The method of claim 1, wherein identifying, by the online system, the plurality of images associated with the advertisement in the ad request comprises:
identifying a landing page included in the advertisement; and
identifying images from a domain including the landing page included in the advertisement.

14. The method of claim 1, wherein receiving information from the user in association with the identified plurality of images, the information identifying the plurality of selected images of the plurality of images and specifying the order in which the plurality of selected images are to be presented comprises:
receiving information identifying the plurality of selected images, the order in which the selected images are to be presented, and one or more parameters for presenting the plurality of selected images.

15. A computer program product comprising a computer readable storage medium having instructions encoded thereon that, when executed by a processor, cause the processor to:
receive an advertisement request ("ad request") at an online system from a user, the ad request associated with an object and including an advertisement comprising video data, and the ad request specifying one or more sources of images;
identify, by the online system, a plurality of images associated with the advertisement in the ad request, the identifying based on:
extracting one or more frames from the video data and identifying each extracted frame as a different image, and
identifying one or more images from the specified one or more sources of images;
present the identified plurality of images to the user;
receive information from the user in association with the identified plurality of images, the information identifying a plurality of selected images of the identified plurality of images, specifying an order in which the selected plurality of images are to be presented, and specifying individual durations of presentation associated with each of the selected images;
receive criteria for presenting an alternative advertisement, the criteria comprising one or more client device characteristics;

generate, by the online system, an alternative advertisement comprising the plurality of selected images presented in the order for the associated specified individual durations, the generated alternative advertisement not including video data; and associate the alternative advertisement generated by the online system with the ad request and with the one or more criteria for presenting the selected images in the order.

16. The computer program product of claim 15, wherein identify, by the online system, the plurality of images associated with the advertisement in the ad request comprises:

identify content items maintained by the online system and associated with the object associated with the ad request; and identify images from one or more of the identified content items.

17. The computer program product of claim 16, wherein identify images from one or more of the identified content items comprises:

determine affinities of users of the online system for the identified content items;

rank the identified content items based on the determined affinities; and identify images from identified content items having at least a threshold position in the ranking.

18. The computer program product of claim 16, wherein identify images from one or more of the identified content items comprises:

determine engagement scores for the identified content items based on interactions by online system users with the identified content items;

rank the identified content items based on the determined engagement scores; and identify images from identified content items having at least a threshold position in the ranking.

19. The computer program product of claim 15, wherein identify, by the online system, the plurality of images associated with the advertisement in the ad request comprises:

identify a landing page included in the advertisement; and identify images from a domain including the landing page included in the advertisement.

20. The computer program product of claim 15, wherein the computer readable storage medium further has instructions encoded thereon that, when executed by the processor, cause the processor to:

receive a request for one or more advertisements from a client device associated with a viewing user;

obtain information associated with the client device associated with the viewing user;

determine information associated with the client device associated with the viewing user satisfies one or more criteria for presenting the selected images in the order; and responsive to the determining, include the alternative advertisement rather than the advertisement in one or more selection processes selecting content for presentation to the viewing user in response to the received request for one or advertisements from the client device.

* * * * *